Patented Apr. 24, 1923.

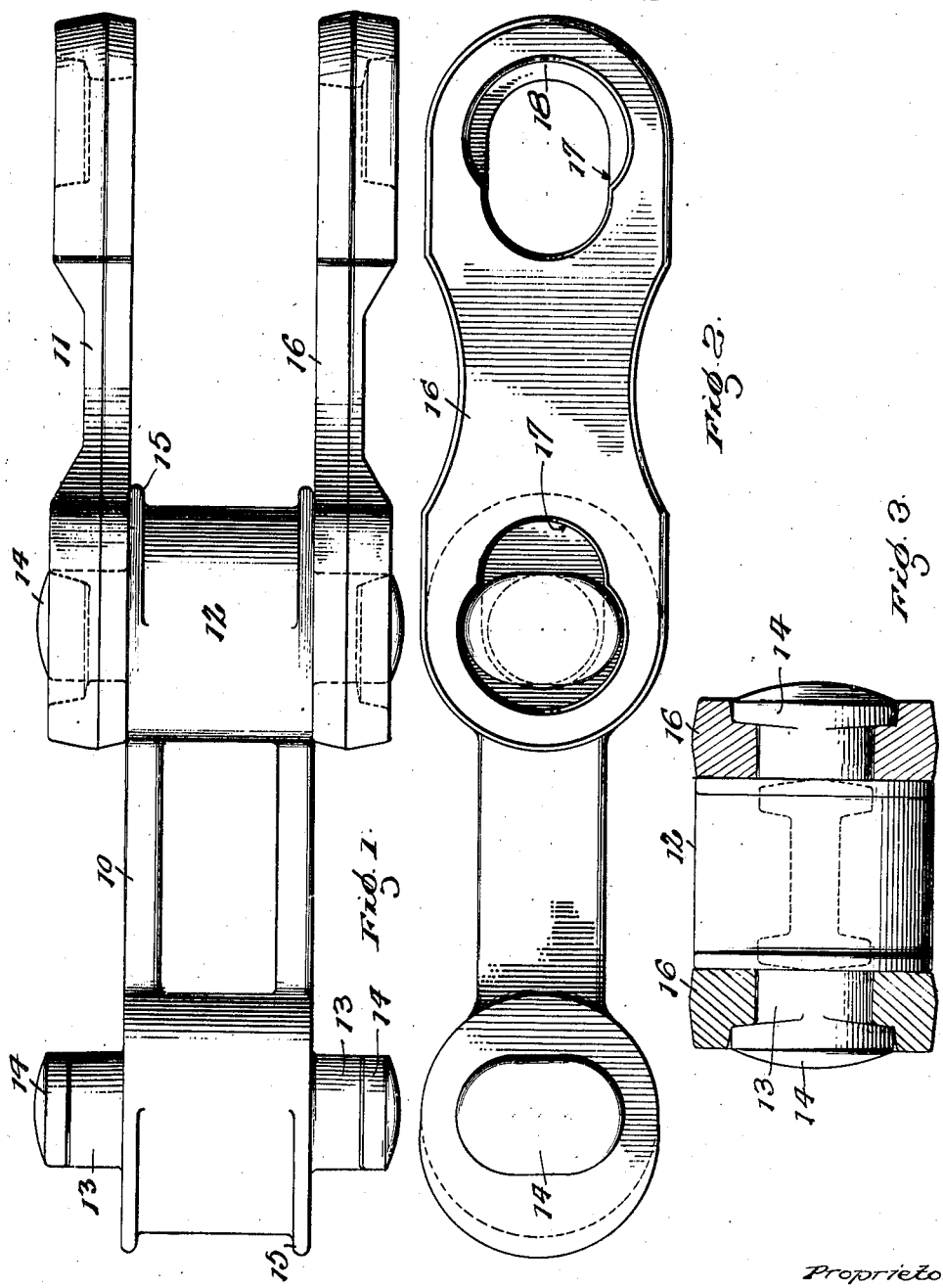

1,453,088

UNITED STATES PATENT OFFICE.

JOSEPH E. BACHMAN AND RAY A. BACHMAN, OF BETHLEHEM, PENNSYLVANIA.

CHAIN LINK.

Application filed December 3, 1921. Serial No. 519,795.

*To all whom it may concern:*

Be it known that we, JOSEPH E. BACHMAN and RAY A. BACHMAN, citizens of the United States, residing at Bethlehem, in the county of Northampton and State of Pennsylvania, have invented certain new and useful Improvements in Chain Links, of which the following is a specification.

This invention has relation to chains for the transmission of power, and has for an object to provide a chain designed particularly for use in connection with sprocket wheels in bucket conveyors wherein the links composing the chain are releasably connected in such a manner as to permit the replacement of broken links in a rapid and efficient manner.

Another object of the invention is to provide a chain for bucket conveyors which consists of alternate solid and open links connected together for relative movement, with means for releasably connecting said links so that they may move relatively around the sprocket wheels, and to be readily separated one from another when the links are brought together at an acute angle for the purpose of replacing broken parts or to insert new links in place of the worn links.

A still further object of the invention is to provide a chain for bucket conveyors which is so constructed as to permit the links to be manufactured in a very economical and rapid manner and which are designed to withstand considerable strain and usage.

In addition to the foregoing this invention comprehends improvements in the details of construction and arrangement of parts to be hereinafter described and particularly set forth in the appended claims.

In the accompanying drawings in which similar and corresponding parts are designated by the same characters of reference throughout the several views in which they appear:

Figure 1 is a view in top plane of a pair of links constituting a portion of a chain constructed in accordance with our invention.

Figure 2 is a view of the links in side elevation, and

Figure 3 is a view in transverse section taken through the pivotal point connecting a pair of links.

With reference to the drawings, 10 indicates the solid links and 11 the open links, constituting a pair of links for use in constructing a chain for bucket conveyors. The solid link consists of a bar which is provided at each end with an integrally formed cylindrical enlargement 12. Extending from each end of each enlargement is a stud 13 which is cylindrical and circular in cross section, and each stud terminates in an oval shaped head 14, the major axis of which is at right angles to the axis of the cylindrical portion 12 and at right angles to the linear dimension of the solid link 10. The connecting portions between the end 12 are preferably channel-shaped in cross section, although if desired the web may be cut away to form a recess to receive a tooth of a sprocket wheel. Each end of each enlargement 12 is also preferably thickened to provide a flange 15 for reinforcement. The open link consists of a pair of bars 16, duplicates in size and construction, having rounded ends of the same diameter as the diameter of the enlargement 12, each link being preferably cut away at opposite edges at its intermediate portion for the purpose of securing lightness of construction. Each end of each bar 16 is formed with an oblong opening 17 extending transversely therethrough of a size to snugly receive the head 14. Said opening 17 however, are so arranged that the major axes thereof are disposed in a line coincident with the longitudinal center of the bar 16. The outer end of each opening 17 is countersunk to provide a substantially semi-circular recess 18 in the outer face of the bar 16 at each end.

In assembling the chain, a pair of bars 16 are applied to one end of a solid link 10 by arranging said bars at right angles to said solid link so that the head 14 at the end of the solid link may enter the opening 17. After said heads are passed through said opening the bars 16 are then rotated to dispose the same in alignment with the solid link or substantially so whereupon the end of the head portion 14 will be seated in the recesses 18 and in this manner the bar 16 will be connected to the solid link against lateral dislodgment. It will also be seen that any relative movement of the bar 16 and solid links must be around the axis of the enlarged portion 12 as a center of rotation, since the wall of the recess 18 terminates at a point slightly more than half of the length of the opening 17. The walls of said recess 18 therefore limit movement of the bar 16 toward and away from the solid link 10 when said bars and links are in a substantially aligned position. It will be seen that since the chain, in passing around a sprocket wheel never positions the solid and open links at a position at right angles to each other, it will be impossible for the parts of the links to become separated.

Thus, it will be seen that we have provided a novel form of chain link in which a pair of co-acting links consist of only three parts, all of which are of simple configuration so that they may be readily manufactured by the drop forging process at a low cost. It will also be seen that the design illustrated compensates for every strain to which the chain may be subjected to in practice without the use of excess metal at any point. Other advantages will be readily apparent to those familiar with the art to which the invention appertains. In practice it is customary to cast or forge lugs on certain of the links for the purpose of supporting the bucket, where the chain is used in a bucket conveyor.

While we have illustrated and described our invention with some degree of particularity, we realize that in practice various alterations therein may be made. We therefore reserve the right and privilege of changing the form of the details of construction or otherwise altering the arrangement of the correlated parts without departing from the spirit of the invention or the scope of the appended claims.

Having thus described our invention, what we claim as new and desire to secure by United States Letters Patent is:—

1. A chain including a plurality of solid links, and a plurality of open links arranged in alternate relation, a pair of headed studs formed at each end of each solid link, each open link comprising a pair of side bars, each side bar having an elongated, semi-circular ended opening at each end to receive the headed studs, and said openings being countersunk for a portion of their circumference to provide recesses in which to receive these heads, the countersunk portion having a diameter slightly greater than the major length of the stud head.

2. A chain including a plurality of solid links each consisting of a pair of substantially cylindrical ends and side bars formed integrally with and connecting said ends, studs each projecting from a respective side of the link in axial alinement with the link end, and elongated heads on said studs having their longer axes substantially at right angles to the longer axis of the respective link; and a plurality of open links alternating with the solid links and having their ends symmetrical, each end having an elongated semicircular ended opening of substantially the same width as the diameter of a stud and of slightly greater length than the length of the stud head, each end being further countersunk in segmento-circular form, the countersink having a diameter somewhat greater than the length of a stud head, the center of the counter sink being coincident with the center of the end of the opening nearer the link end.

In testimony whereof we affix our signatures in presence of two witnesses.

JOSEPH E. BACHMAN. [L. S.]
RAY A. BACHMAN. [L. S.]

Witnesses:
  JAS. D. FAUST,
  RUSSELL D. FAUST.